United States Patent [19]

Shioyama et al.

[11] Patent Number: 5,215,689
[45] Date of Patent: Jun. 1, 1993

[54] METHOD FOR PRODUCTION OF HIGH-PERFORMANCE C/C COMPOSITES

[75] Inventors: Hiroshi Shioyama, Ikeda; Isao Souma, Ibaraki; Kuniaki Tatsumi; Masaki Narisawa, both of Ikeda, all of Japan

[73] Assignee: Agency of Industrial Science & Technology, Ministry of International Trade & Industry, Tokyo, Japan

[21] Appl. No.: 664,664

[22] Filed: Mar. 5, 1991

[30] Foreign Application Priority Data

Mar. 20, 1990 [JP] Japan ................................ 2-71579

[51] Int. Cl.$^5$ ........................ D01F 11/12; C01B 31/02
[52] U.S. Cl. ................................ 264/29.5; 264/29.6; 264/29.7; 264/81; 264/85; 264/102; 264/135; 423/447.5; 423/447.7; 427/228; 427/255.6
[58] Field of Search ................ 264/29.1, 29.2, 29.5, 264/56, 60, 29.6, DIG. 19, 29.7, 81, 85, 102, 135, 319, DIG. 20; 423/447.5, 447.4, 447.7; 427/227, 228, 255.6

[56] References Cited

U.S. PATENT DOCUMENTS 4,950,443  8/1990  Kawakubo et al. ............... 264/29.5
5,096,519  3/1992  Kawakubo et al. ............... 264/29.6

FOREIGN PATENT DOCUMENTS 47-26974   7/1972  Japan ........................... 423/447.5
1301101   12/1972  United Kingdom ............ 423/447.5
2151221    7/1985  United Kingdom ............ 423/447.5

OTHER PUBLICATIONS

"Fiber-Matrix Interactions in Unidirectional Carbon--Carbon Composites", Ceramic Bulletin, vol. 57, No. 2 (1978), pp. 193-198.
*Carbon*, (1987), 25, pp. 163-190, "The Future of Carbon-Carbon Composites", Erich Fitzer.
*Journal of Synthetic Organic Chemistry*, (1980), 38, "Carbonization Reactions of Organic Compounds", Mochida et al, pp. 433-446.
*Bulletin of the Chemical Society of Japan*, (1979), 52, pp. 3400-3406, "A Novel Carbonization of Naphthalene and Other Aromatic Compounds . . . ", Ota et al.
*Journal of the Chemical Society of Japan*, 9, (1989), pp. 1210-1215.
*Carbon*, (1975), 13, pp. 489-493, "Carbonization of Aromatic Hydrocarbons-III-Carbonization Catalysted by Alkali Metals", Mochida et al.
*Carbon*, (1976), 14, pp. 341-344, "Carbonization of Aromatic Hydrocarbons—IV-Microscopic Features of Carbons Obtained by the Aid . . . " Mochida et al.
*Physical Review B*, (1980), 21, pp. 862-868, "Raman and Infrared Spectra of Graphite-AlCl$_3$", Gualberto et al.
*Carbon*, (1983), 21, pp. 121-129, "Traman Spectra and Staging of Intercalated Graphite Fibers", Kwizera et al.
*The Carbon Society of Japan*, (1985), 12, pp. 18-19.
*Carbon* (1976), 14, pp. 123-129, "Carbonization of Aromatic Hydrocarbons-IV-Reaction Path of Carbonization Catalyzed by Alkali Metals", Mochida et al.

*Primary Examiner*—Jeffery Thurlow
*Assistant Examiner*—Mathieu Vargot
*Attorney, Agent, or Firm*—Oblon, Spivak, McClelland, Maier & Neustadt

[57] ABSTRACT

A C/C composite including a carbon matrix and carbon fibers and exhibiting a crystal structure of the carbon matrix differing between (a) the portion at and in the vicinity of the interface between the carbon fibers and the carbon matrix and (b) the other portion of the carbon matrix and excelling in strength and thermal conductivity is produced by a method which includes intercalating a carbonizing catalyst in carbon fibers, causing said carbon fibers having said carbonizing catalyst intercalated therein to be impregnated with a precursor of a carbon matrix, and then firing the product of impregnation.

10 Claims, 2 Drawing Sheets 3 2 1

METHOD FOR PRODUCTION OF HIGH-PERFORMANCE C/C COMPOSITES

BACKGROUND OF THE INVENTION

1. Field of the Invention

This invention relates to a high-performance C/C (carbon/carbon fiber) composite produced by means of intercalation and to a method for the production of the C/C composite.

In view of its super-heat resistant characteristics, the C/C composite is already being used in airplane brakes and fuel cells, for example, and other promising future fields of application include aerospace (e.g. rockkets) fusion reactors, and nuclear reactors.

The C/C composite is produced by mixing carbon fibers as a reinforcing agent with pitch or resin as a precursor of a carbon matrix and firing the resultant mixture. It, therefore, comprises a carbon matrix produced by firing the precursor and carbon fibers used as a reinforcing agent.

2. Description of the Prior Art

C/C composites have attracted attention as materials with high utility in extremely high temperature applications and various efforts have been made toward improving their performance. The factors which determine whether a C/C composite can be effectively used at extremely high temperatures are the kind of carbon fibers, the kind of carbon of the composite matrix, the condition of the carbon fibers in the matrix, and the temperature at which the precursor of the matrix carbon is fired for carbonization.

It has been demonstrated that properties of the C/C composite such as mechanical strength and thermal conductivity heavily hinge not only on the kinds of raw materials and the method of production but also on the condition of the interface between the carbon fibers and the carbon matrix. With existing techniques, however, it is difficult to control the condition of this interface.

In the carbonization of a low molecular compound such as pitch, when a Lewis acid such as aluminum chloride is added to the reaction system, it functions as a catalyst for the cationic polymerization reaction and enhances the carbonization yield and ensures production of carbon of a high capacity for graphitization. On the other hand, when potassium is added to the reaction system instead of a Lewis acid, a reaction having an anion radical as an intermediate proceeds prior to the carbonization reaction. The result is a carbon that has low capability for graphitization.

It is well known that an interlayer compound can be formed between layers of graphite by intercalating a guest substance such as aluminum chloride, potassium or other such chemical species. The intercalated chemical species generates an interaction in the ionic bond between the host and the guest. When this interlayer compound is heated to between about 100° C. and about 800° C., the guest chemical species is liberated deintercalated from between the layers of graphite. This temperature range approximately coincides with the temperature range in which the low molecular compound begins to undergo carbonization.

The present inventors focused their attention on the interrelation between the aforementioned reaction of catalytic carbonization and the nature of the graphite interlayer compound. They consequently found that the properties of the C/C composite such as strength and thermal conductivity can be improved by using carbon fibers obtained by intercalating therein a carbonizing catalyst as a guest substance and further that the interface between the carbon fibers and the carbon matrix in the C/C composite can be easily controlled by controlling the amount of the guest substance intercalated. This invention has been accomplished on the basis of this finding.

SUMMARY OF THE INVENTION

This invention is directed to a method for the production of a C/C composite, which method comprises intercalating a carbonizing catalyst in carbon fibers, causing the carbon fibers now having the carbonizing catalyst intercalated therein to be impregnated with a precursor of a carbon matrix, and firing the result to obtain a C/C composite comprising a carbon matrix formed by the firing of the precursor of the carbon matrix and carbon fibers having undergone deintercalation of the carbonizing catalyst, the crystal structure of the carbon matrix differing between (a) the portion at and in the vicinity of the interface between the carbon fibers and the carbon matrix and (b) the remaining portion of the carbon matrix, and to a C/C composite to be produced by the method described above.

The above and other objects and features of the invention will become apparent from the following detailed description with reference to the accompanying drawing.

DETAILED DESCRIPTION OF THE PREFERRED EMBODIMENTS

Figure 1:
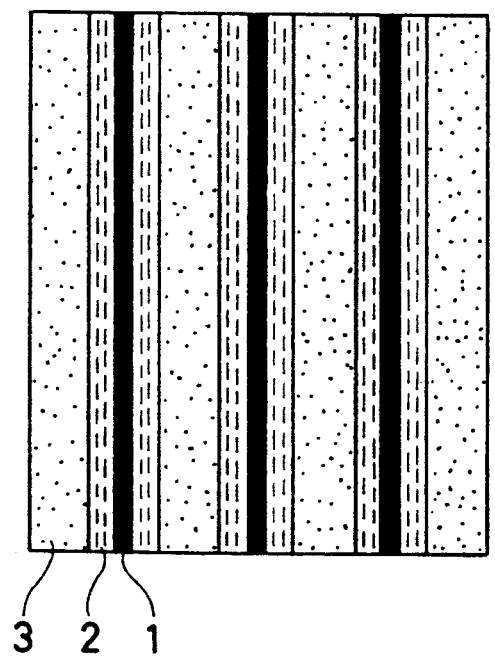
FIG. 1 is a schematic view showing the crystal structure of the carbon matrix of C/C composite of this invention.

In the method of this invention, the carbonizing catalyst intercalated in the carbon fibers is deintercalated during the aforementioned firing. The condition of crystallization of the carbon matrix at and in the vicinity of the interface between the carbon fibers and the carbon matrix can be controlled by varying the amount and the kind of the carbonizing catalyst intercalated.

Properties of the C/C composite such as strength and thermal conductivity can thus be controlled to meet specific requirements.

The method of this invention begins with the intercalation of at least one carbonizing catalyst in carbon fibers. Then, the carbon fibers which have the carbonizing catalyst intercalated therein are impregnated with a precursor of a carbon matrix.

The carbon fibers for use in this invention are not particularly restricted but may be selected from among carbon fibers heretofore used in the field. Carbon fibers which can be effectively used include coal tar pitch type carbon fibers, oil tar pitch type carbon fibers, and polyacrylonitrile type carbon fibers.

The carbonizing catalyst used is a chemical species for catalyzing the carbonization reaction. Specific examples are aluminum chloride and potassium.

Though the amount of the carbonizing catalyst intercalated is not particularly restricted, it is generally desired to be in the range of from about 0.5% by weight to about 10% by weight based on the carbon fibers. The carbonizing catalyst fails to manifest a discernible effect if the amount is less than 0.5% by weight. The finally produced C/C composite is deficient in strength if the amount exceeds 10% by weight. Particularly desirably, this amount is in the range of from 2% by weight to about 5% by weight.

The intercalation of the carbonizing catalyst to the carbon fibers can be carried out by any of the conventional methods such as the vapor-phase method and the liquid-phase method, for example. This operation is performed under conditions suitable for the quality which the C/C composite is required to exhibit. To be more specific, a C/C composite which satisfied predetermined requirements is obtained by controlling the amount of the carbonizing catalyst to be intercalated and consequently suitably controlling the condition of the interface between the carbon fibers and the carbon matrix in the C/C composite.

The strength of carbon fibers is generally impaired when a chemical species is intercalated therein. In the present invention, however, since the chemical species to be intercalated functions as a catalyst, the amount of this chemical species intercalated is so small as not to have an adverse effect on the strength of the carbon fibers.

Substances which can be effectively used as the precursor of the carbon matrix include pitches such as coal tar pitch and petroleum pitch, hydrocarbon gases such as methane and propane, and thermosetting resins such as phenol resin and furan resin.

The firing treatment given to the carbon fibers impregnated with the precursor of carbon matrix is generally carried out at a temperature in the range of from 500° C. to 3,300° C. When a pitch or a thermosetting resin is used as the precursor, the carbon fibers may be uniformly mixed with the pitch or resin as is commonly practised, whereafter the resultant mixture is subjected to the firing treatment. When a hydrocarbon gas is used as the precursor, the carbon fibers may be exposed to the gas and coated with a deposited layer obtained from the gas.

The C/C composite fails to acquire the required quality if the temperature of the firing treatment falls short of the lower limit, 500° C. The matrix of the composite is converted into graphite if the temperature exceeds 1,500° C. and the highest practical temperature is 3,300° C.

Desirably, the amount of the carbon fibers used is approximately in the range of 5 to 60% by volume, preferably 40 to 60% by volume, based on the total amount of the carbon fibers and the precursor.

The quality of the C/C composite becomes too poor for practical use if this amount falls short of the lower limit, 5% by volume.

The carbon fibers cannot be impregnated with the precursor if this amount exceeds 60% by volume.

When the carbon fibers impregnated with the precursor are subjected to the firing treatment described above, the following phenomenon ensues.

The carbonizing catalyst intercalated in the carbon fibers is liberated (deintercalated). In the meantime, the precursor is carbonized to form the matrix of the C/C composite. In consequence of the deintercalation of the carbonizing catalyst from the carbon fibers, there arises a difference in crystal structure of the carbon matrix differing between (a) the portion at and in the vicinity of the interface between the carbon fibers and the carbon matrix and (b) the remaining portion of the carbon matrix.

One example of this difference in the crystal structure of the carbon matrix is shown in FIG. 1, wherein reference numeral 1 designates a carbon fiber, 2 a carbon matrix and 3 a carbon layer having a more graphitized crystal structure than the carbon matrix 2.

The differing crystal structure of carbon matrix at and closely adjoining the interface between the carbon fibers and the carbon matrix varies with the kind and amount carbonizing catalyst intercalated in the carbon fibers.

By adjusting the various conditions mentioned above, therefore, the structure of the interface aimed at can be obtained. The relation between the structure of the interface and the conditions mentioned above can be easily determined by an experiment.

The C/C composite of this invention enjoys highly satisfactory adhesiveness of the matrix to the carbon fibers in the interface and, therefore, is greatly superior to conventional C/C composites in such properties as mechanical strength and thermal conductivity.

Now, this invention will be described more specifically below with reference to a working example, which is intended to be merely illustrative of and not in any sense limitative of this invention.

EXAMPLE

Separate portions of a refractory glass tube were charged with two grams of pitch type carbon fibers and one gram of aluminum chloride and, after vacation and displacement of the remaining gaseous phase with nitrogen, sealed by fusion. The reaction tube was placed in an electric furnace and the carbon fiber portion and the aluminum chloride portion thereof were maintained respectively at 120° C. and 100° C. for two hours so as to maintain the chlorine pressure in the reaction tube at 100 Torrs. As a result, 2.05 grams of carbon fibers having $AlCl_3$ intercalated therein ($AlCl_3$ content about 2.5% by weight) were obtained.

Figure 2:
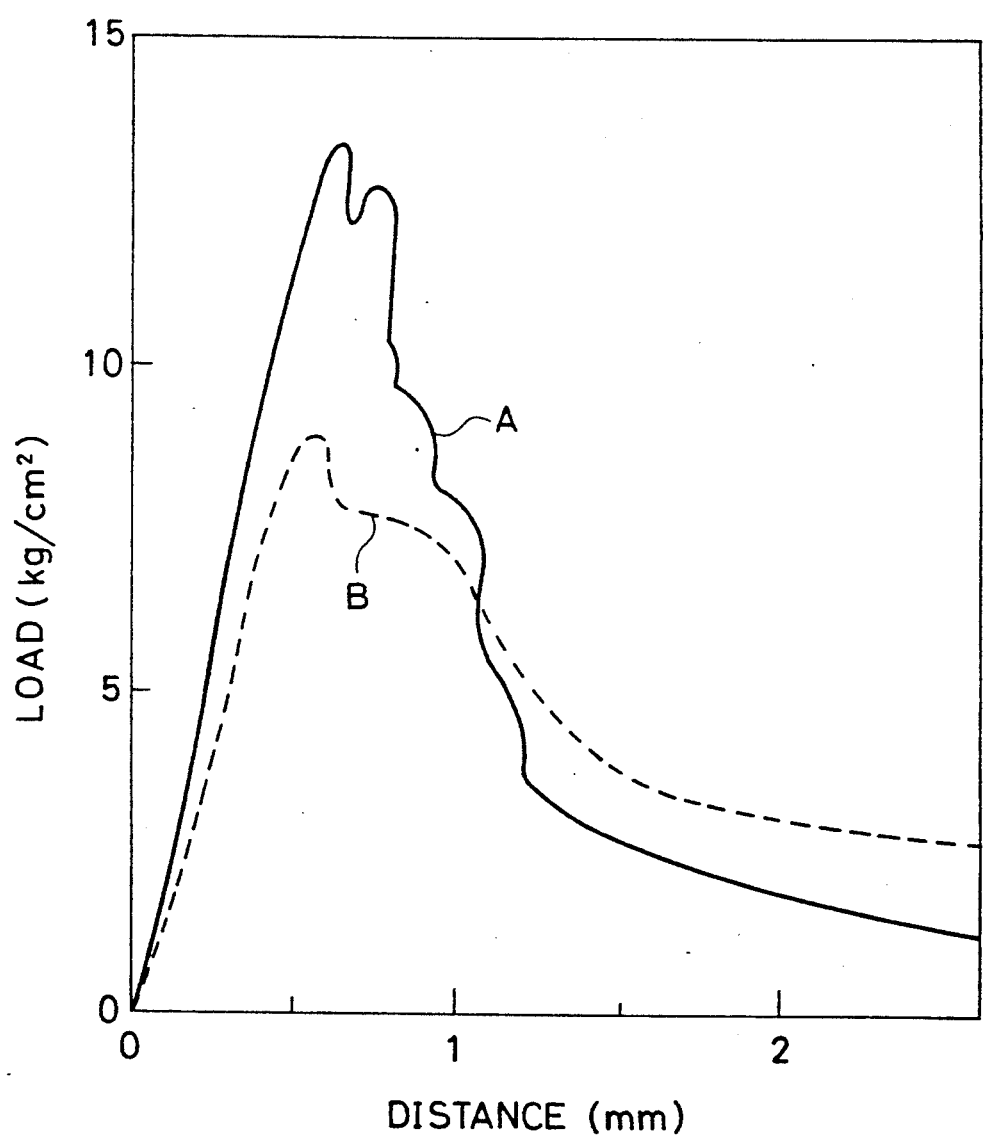
FIG. 2 is a graph showing the results of a three-point bending test for a C/C composite in each of Example and Comparative Experiment.

The carbon fibers were packed in a glass tube, impregnated under a vacuum with coal tar pitch to a volume content of about 50% and heat-treated in an autoclave (at 800° C under 100 atmospheres), to produce a C/C composite of the present invention. A test piece cut from this C/C composite was subjected to a three-point bending test. As a result, the relationship between the load and the distance was as shown by curve A in FIG. 2. This test piece was further subjected to a physical property test and was consequently found to exhibit a specific gravity of 1.53 kg/cm$^3$, Young's modulus of 3.54 kg/cm$^2$ and bending strength of 34.1 kg/cm$^2$.

COMPARATIVE EXPERIMENT

A C/C composite was produced by following the procedure of Example 1, except that two grams of the same pitch type carbon fibers as used in Example 1 were used without intercalation of $AlCl_3$. A test piece cut from this C/C composite was subjected to a three-point bending test and to a physical property test. The results of the three-point bending test were as shown by curve B in FIG. 1. As a result of the physical property test, the test piece was found to exhibit a specific gravity of 1.14 kg/cm$^3$, Young's modulus of 1.95 kg/cm$^2$ and bending strength of 20.1 kg/cm$^2$.

It is clear from the test results that the C/C composites of this invention were superior to the C/C composite of the Comparative Experiment in three-point flexural strength and thermal conductivity. It will also be noted that C/C composites possessing different magnitudes of strength and thermal conductivity were obtained by using different kinds of carbonizing catalyst.

Thus, the method of this invention enables control of the condition of the interface between carbon fibers and carbon matrix.

What is claimed is:

1. A method for producing a C/C composite having improved mechanical strength and thermoconductivity, said composite consisting of carbon fibers and a carbon matrix having a contacting portion in contact with said carbon dibers and a remaining portion, wherein said contacting portion and said remaining portion having different crystal structures, said method comprising the steps of:

placing a carbonizing catalyst and carbon fibers in a container and evacuating said container, heating said evacuated container to intercalate said carbonizing catalyst into said carbon fibers, impregnating said intercalated carbon fibers with a carbon matrix precursor to form a impregnated product, and heating said impregnated product under pressure to deintercalate said carbonizing catalyst from said carbon fibers to produce said C/C composite.

2. A method according to claim 1, wherein said carbonizing catalyst is selected from the group consisting of Lewis acids and potassium.

3. A method according to claim 1, wherein said carbon fibers one selected from the group consisting of coal tar pitch carbon fibers, oil tar pitch carbon fibers, and polyacrylonitrile carbon fibers.

4. A method according to claim 1, wherein the amount of said carbonizing catalyst intercalated in said carbon fibers is in the range of from 0.5% to 10% by weight, based on the amount of said carbon fibers.

5. A method according to claim 1, wherein said precursor of a carbon matrix is selected from the group consisting of pitch, hydrocarbon gases, and thermosetting resins.

6. A method according to claim 5, wherein said precursor of a carbon matrix is selected from the group consisting of coal tar, petroleum pitch, methane, propane, phenol resin, and furan resin.

7. A method according to claim 1, wherein said impregnated product is fired at a temperature in the range of from 500° C. to 3,300° C.

8. A method according to claim 1, wherein from 2 wt.% to about 5 wt.% carbonizing catalyst is intercalated in said carbon fibers, based on the amount of said carbon fibers.

9. A method according to claim 1, wherein said impregnated product comprises 5–50 volume percent of said carbon fibers based on the total amount of carbon fibers and carbon matrix precursor.

10. A method according to claim 9, wherein said impregnated product comprises 40–60 volume percent of said carbon fibers.

* * * * *